Sept. 23, 1930.  C. R. LIVERMON  1,776,736
STRIPPER TOOTH FOR THRASHING MACHINES
Filed March 22, 1928
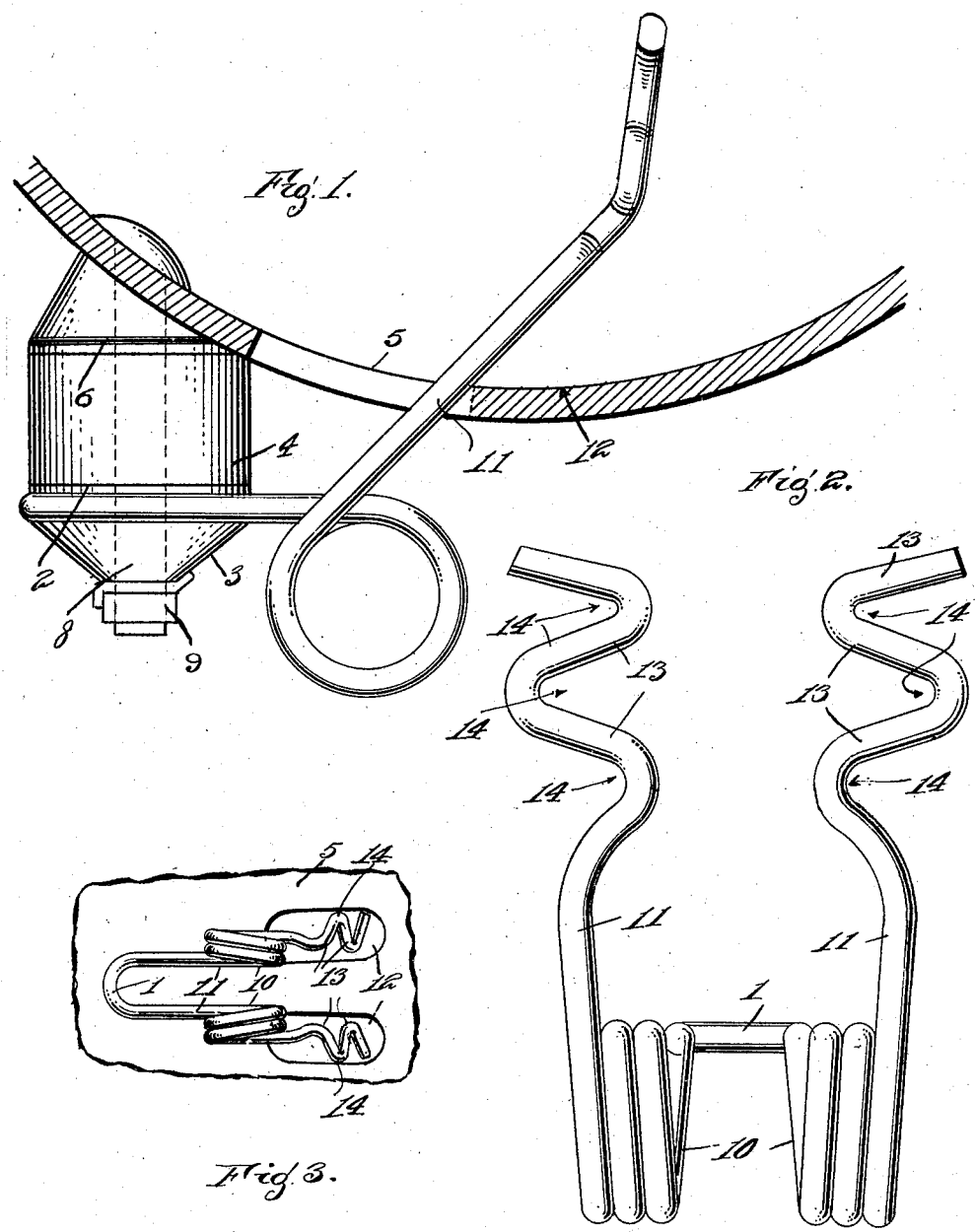
INVENTOR
Carl R. Livermon.
BY
ATTORNEYS Patented Sept. 23, 1930

1,776,736

UNITED STATES PATENT OFFICE

CARL R. LIVERMON, OF ROXOBEL, NORTH CAROLINA

STRIPPER TOOTH FOR THRASHING MACHINES

Application filed March 22, 1928. Serial No. 263,734.

This invention relates to thrashing machines which strip the crop from the vines or branches upon which it is grown, and is more particularly concerned with the construction of stripping teeth used for this purpose in such machines.

In the use of such teeth in peanut thrashing machines, to which my improved tooth is more advantageously applied, a drum having spring fingers extending from its periphery is housed partly within a concave having a series of spaced slots therein through which a series of spring teeth extend from the exterior of the concave and cooperate with the drum fingers in stripping the pods or peanut shells from their vines. Such a construction is shown in my application for Peanut thrashing machine, Serial No. 92,900, and the invention will be described in its application to such a construction as examplifying its use and practical application.

In this type of peanut thrashing machines, one or more of the concaves have finger slots of substantially greater width than the diameter of the fingers projecting therethrough from the exterior to permit pods or shells stripped from the vines by the fingers to fall through the slots upon a suitable screen or belt placed therebelow. Such a construction necessitates the spacing of the slots so that with longitudinally straight fingers projecting therethrough, the fingers are spaced apart to such an extent that complete stripping of the vines is not accomplished when the vines of the crop harvested become reduced in bulk.

To meet this contingency by providing a type of stripping finger which is effective to handle both light and heavily bulked crops to advantage is the object of the present invention.

A feature of the invention consists of a stripping finger having its end or stripping portion formed with transversely extending convolutions. Not only does such a construction serve to reduce the spacing between adjacent stripping fingers, but it provides each finger with a succession of reversed stripping notches of approximate U shape through which the vines pass and by the sides of which, the pods or shells are caught and stripped off. Preferably the convolutions are formed to project in alternation on opposite sides of the longitudinal median line of the finger so that the latter may have its shank below the convolutions centered in its slot.

Advantageously, the invention may be and is shown as embodied in a double spring finger of the type shown in my application aforesaid.

The described construction and its advantages will be more clearly apparent from the following detailed specification read in conjunction with the accompanying drawings forming part thereof and in which:—

Figure 1 is a longitudinal section through a slotted cylinder concave of a thrasher showing the spring finger of the present invention applied thereto and appearing in elevation.

Figure 2 is a rear elevation of the spring finger shown in Figure 1.

Figure 3 is a bottom plan view on a reduced scale of the concave and finger shown in Figure 1, the mount for the finger base being omitted.

Referring more particularly to Figures 1 and 2 of the drawings, it will be seen that the double spring finger is formed by a length of spring wire bent intermediate of its ends to form a U shaped anchoring loop 1, which, as indicated in Figure 1 is loosely seated in an annular groove 2 formed in the base of an anchor cap 3, the base of which cap is seated on a block 4 positioned to incline toward the outer peripheral surface of the concave 5 by a wedge plate 6 interposed between it and the concave, these parts being held together and on the exterior of the concave by a bolt 8 extended therethrough from the interior of the concave with its outer threaded end engaged by the clamping nut 9 on the outer face of the anchor cap 3. This mount or anchor for the spring finger corresponds to that disclosed in my application aforesaid.

At the ends of the central anchor yoke 1, the wire is bent downwardly and formed as spaced spring coils 10, and then is extended upwardly at an angle to the anchor loop 1 forming the shanks 11 of dual spring fingers.

These shanks will extend inwardly through adjacent slots 12 (Figure 3) in the concave and above the shank portions 12, its working or stripper ends are bent transversely to form a plurality of transverse convolutions 13 which preferably extend uniformly and in alternately opposite directions beyond the longitudinal median line of the shank portions 11. The convolutions 13 provide a succession of reverse U shape stripping notches 14 through which the vines will pass and by the sides of which the pods or nuts will be caught and stripped from the vines as the latter are drawn between or over the stripper fingers, as by the fingers of a rotating cylinder or drum as previously described.

While I have shown and described the invention as embodied in a dual stripping finger of particular form and structure, it is to be understood that such embodiment is illustrative rather than restrictive of the invention and that various structural modifications adapting the invention to varying conditions are contemplated in consonance with the spirit of the invention and scope of the appended claims.

What I claim therefore, and desire to secure by Letters Patent is:

1. A stripping finger for thrashing machines having its work-engaging portion formed with transversely extending convolutions providing a succession of stripping notches.

2. A stripping finger for thrashing machines having a shank portion formed with a plurality of convolutions projecting transversely in alternation beyond opposite sides of the longitudinal median line of the shank.

3. A stripping finger for thrashing machines having a work engaging shank portion formed with convolutions extending transversely in alternation beyond opposite sides of the longitudinal median line of its shank and forming a succession of substantially U shaped stripping notches.

4. A stripping spring finger for thrashing machines having an anchoring end, an intermediate spring coil and a terminal spring finger formed with transversely extending convolutions.

5. Stripping fingers for thrashing machines comprising a central anchoring base loop having its ends provided with spaced spring coils, with terminal shanks projecting from said coils in spaced, substantially parallel relation and formed with convolutions traversing the longitudinal median lines of the shanks and providing a succession of stripping notches.

6. In a thrashing machine having a thrashing surface provided with an elongated slot therein, a stripping finger having an anchoring face mounted on said surface, an intermediate spring coil extended from said base and offset from said surface and a terminal spring finger extended from said spring coil through said slot and having its end portion beyond the slot formed with convolutions extending transversely of the width of the slot and providing a series of stripping notches.

7. A thrashing machine having a thrashing surface provided with an elongated slot therein forming a discharge passage for thrashed material, a stripping finger having one end formed as an anchoring base and mounted on one face of said thrashing surface, and having an intermediate spring coil offset from said surface and a spring finger of less diameter than the width of said slot extending from said coil through said slot to the opposite face of said surface and formed beyond said surface with a plurality of convolutions extending transversely of the width of the slot and at opposite sides of the longitudinal median line of the shank portion extending through said slot.

8. In a thrashing machine, a concave having an elongated slot therein, and a stripping finger having an anchoring end mounted upon the exterior of the concave, with an intermediate spring coil offset from the exterior of the concave, and extended inwardly from said coil as a stripping finger projecting through said slot and having its end portion formed as a plurality of reversely curved convolutions extending transversely of the width of the slot and providing a plurality of stripping notches.

9. In a thrashing machine, a concave having a pair of spaced elongated slots therein forming discharge passages for thrashed material and extending substantially in parallel, and a double spring finger having a central anchoring base at one end mounted on the exterior of the concave and extended to form a pair of intermediate spaced spring coils offset from the concave with stripping finger portions extending from said coils to project through said pair of spaced slots and provided with a plurality of reversely curved convolutions extending transversely of the width of the slots above said concave, the shanks of said finger portions projecting through said slots having diameters less than the width of said slots to permit the passage of material therethrough.

10. In a thrashing machine, a concave having a pair of spaced elongated slots therein forming discharge passages for material and extending substantially in parallel, and a double spring stripping finger having one end formed as an anchoring base loop and mounted upon the exterior of the concave, with the opposite sides of the base loop extended outwardly from the concave and formed with spaced spring coils laterally extended from said loop in reverse directions with their ends returned toward the concave as finger shank portions of less diameter than the width of said slots projecting through said slots to the interior of the concave and above said concave formed with convolutions extending transversely of said slots and at opposite sides of the longitudinal median line of their shank portions extending through said slots.

CARL R. LIVERMON.